United States Patent
Pelster et al.

(10) Patent No.: US 12,366,965 B2
(45) Date of Patent: *Jul. 22, 2025

(54) SOLID STATE DRIVE WITH MULTIPLEXED INTERNAL CHANNEL ACCESS DURING PROGRAM DATA TRANSFERS

(71) Applicant: SK hynix NAND Product Solutions Corporation, Rancho Cordova, CA (US)

(72) Inventors: David J. Pelster, Longmont, CO (US); Yogesh B. Wakchaure, Folsom, CA (US); Neelesh Vemula, Sunnyvale, CA (US); Aliasgar S. Madraswala, Folsom, CA (US); David B. Carlton, Oakland, CA (US); Donia Sebastian, Fair Oaks, CA (US); Mark Anthony Golez, Folsom, CA (US); Xin Guo, San Jose, CA (US)

(73) Assignee: SK hynix NAND Product Solutions Corporation, Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,480

(22) Filed: Sep. 27, 2023

(65) Prior Publication Data

US 2024/0020013 A1 Jan. 18, 2024

Related U.S. Application Data

(63) Continuation of application No. 16/712,647, filed on Dec. 12, 2019, now Pat. No. 11,797,188.

(51) Int. Cl.
*G06F 13/16* (2006.01)
*G06F 3/06* (2006.01)

(52) U.S. Cl.
CPC .......... *G06F 3/0613* (2013.01); *G06F 3/0659* (2013.01); *G06F 3/0679* (2013.01); *G06F 13/1668* (2013.01)

(58) Field of Classification Search
CPC .... G06F 3/0613; G06F 3/0659; G06F 3/0679; G06F 13/1668

(Continued)

(56) References Cited

U.S. PATENT DOCUMENTS 9,570,159 B1 * 2/2017 Wakchaure ......... G11C 11/4096
9,679,658 B2 6/2017 Pelster et al.

(Continued)

FOREIGN PATENT DOCUMENTS

KR 20230142047 10/2023

OTHER PUBLICATIONS

International Search Report and Written Opinion dated May 7, 2024 in International Patent Application No. PCT/US2023/085400, pp. 1-9.

(Continued)

*Primary Examiner* — Christopher B Shin
(74) *Attorney, Agent, or Firm* — Byrne Poh LLP

(57) ABSTRACT

A method performed by a solid state drive is described. The method includes, on a channel that internally couples a controller of the solid state drive to a storage device of the solid state drive, sending write data for a program operation to be performed by one of the storage device's logical units in separate chunks over the channel. The method also includes inserting higher priority traffic items of other logical units of the storage device in between the separate chunks.

24 Claims, 6 Drawing Sheets

(58) Field of Classification Search
USPC .......................................................... 711/103
See application file for complete search history.

(56) References Cited

U.S. PATENT DOCUMENTS

| | | | |
|---|---|---|---|
| 9,940,022 | B1 | 4/2018 | Bitner |
| 10,042,768 | B1* | 8/2018 | Karnowski ............ H04L 67/568 |
| 10,789,130 | B1* | 9/2020 | Horspool ............ G06F 11/1441 |
| 12,079,514 | B2 | 9/2024 | Urrinkala et al. |
| 2010/0180105 | A1 | 7/2010 | Asnaashari |
| 2010/0199033 | A1 | 8/2010 | Nguyen |
| 2010/0262721 | A1 | 10/2010 | Asnaashari |
| 2010/0287333 | A1* | 11/2010 | Lee ..................... G06F 12/0873 |
| | | | 711/135 |
| 2011/0010490 | A1 | 1/2011 | Kwon |
| 2012/0159052 | A1 | 6/2012 | Lee |
| 2012/0159474 | A1 | 6/2012 | Chakhaiyar |
| 2012/0278664 | A1* | 11/2012 | Kazui ................. G06F 11/1012 |
| | | | 714/48 |
| 2013/0067144 | A1* | 3/2013 | Namba ................... G06F 3/065 |
| | | | 711/E12.001 |
| 2014/0025873 | A1 | 1/2014 | Nguyen |
| 2014/0258596 | A1 | 9/2014 | Kojima |
| 2015/0261452 | A1 | 9/2015 | Moon et al. |
| 2016/0179404 | A1* | 6/2016 | Nanduri ............... G06F 3/0613 |
| | | | 711/103 |
| 2017/0090802 | A1 | 3/2017 | Margetts |
| 2017/0147244 | A1 | 5/2017 | Matsumura |
| 2017/0147258 | A1 | 5/2017 | Kim |
| 2017/0228154 | A1* | 8/2017 | Liu ..................... G06F 11/1441 |
| 2017/0336978 | A1 | 11/2017 | Fanning |
| 2018/0067797 | A1* | 3/2018 | Miao .................... G06F 3/0679 |
| 2018/0173461 | A1 | 6/2018 | Carroll |
| 2018/0232157 | A1* | 8/2018 | Seo ..................... G06F 3/0688 |
| 2018/0335981 | A1 | 11/2018 | Yoshida et al. |
| 2019/0042111 | A1* | 2/2019 | Garcia ............... G06F 11/1471 |
| 2019/0043593 | A1 | 2/2019 | Guo |
| 2019/0050312 | A1* | 2/2019 | Li ......................... G11C 16/105 |
| 2019/0065086 | A1 | 2/2019 | Margetts |
| 2019/0121546 | A1 | 4/2019 | La Fratta |
| 2019/0146669 | A1 | 5/2019 | Madraswala et al. |
| 2019/0146679 | A1 | 5/2019 | Doh et al. |
| 2019/0163403 | A1* | 5/2019 | Madraswala ........... G06F 3/061 |
| 2019/0243577 | A1 | 8/2019 | Pelster et al. |
| 2020/0117369 | A1 | 4/2020 | Pelster et al. |
| 2021/0081137 | A1* | 3/2021 | Nakashima ............. G06F 3/061 |
| 2021/0279188 | A1 | 9/2021 | Goss et al. |
| 2021/0279196 | A1* | 9/2021 | Jinn ..................... G06F 13/374 |
| 2021/0303173 | A1 | 9/2021 | Wu et al. |
| 2021/0326172 | A1* | 10/2021 | Muthiah ................ G06F 9/542 |
| 2022/0011971 | A1 | 1/2022 | Kao |
| 2022/0027069 | A1 | 1/2022 | Henze et al. |

OTHER PUBLICATIONS

Notice of Allowance dated Jun. 20, 2023 in U.S. Appl. No. 16/712,647, pp. 1-26.
Office Action dated Jan. 19, 2023 in U.S. Appl. No. 16/712,647, pp. 1-23.
Office Action dated Jun. 5, 2024 in U.S. Appl. No. 18/090,358, pp. 1-13.
Office Action dated Oct. 7, 2024 in U.S. Appl. No. 18/090,358, pp. 1-21.
U.S. Appl. No. 16/712,647, filed Dec. 12, 2019, pp. 1-14.
U.S. Appl. No. 18/090,358, filed Dec. 28, 2022, pp. 1-13.
Notice of Allowance dated Mar. 31, 2025 in U.S. Appl. No. 18/090,358, pp. 1-32.

* cited by examiner

SOLID STATE DRIVE WITH MULTIPLEXED INTERNAL CHANNEL ACCESS DURING PROGRAM DATA TRANSFERS

CROSS-REFERENCE TO RELATED APPLICATIONS

This application is a continuation of U.S. patent application Ser. No. 16/712,647, filed Dec. 12, 2019, which is hereby incorporated by reference herein in its entirety.

FIELD OF INVENTION

The field of invention pertains generally to the computing sciences, and, more specifically, to a solid state drive with multiplexed internal channel access during program data transfers.

BACKGROUND

High performance computing environments such as data center and/or cloud computing environments are heavily measured by their ability to grant many users/clients access to non volatile mass storage with low latency. As such, systems and storage designers are continually seeking ways to reduce bottlenecks or other inefficiencies that can cause one or more of the users/clients to perceive the performance of their non volatile mass storage as being slow.

FIGURES

A better understanding of the present invention can be obtained from the following detailed description in conjunction with the following drawings, in which.

DETAILED DESCRIPTION

Figure 1:
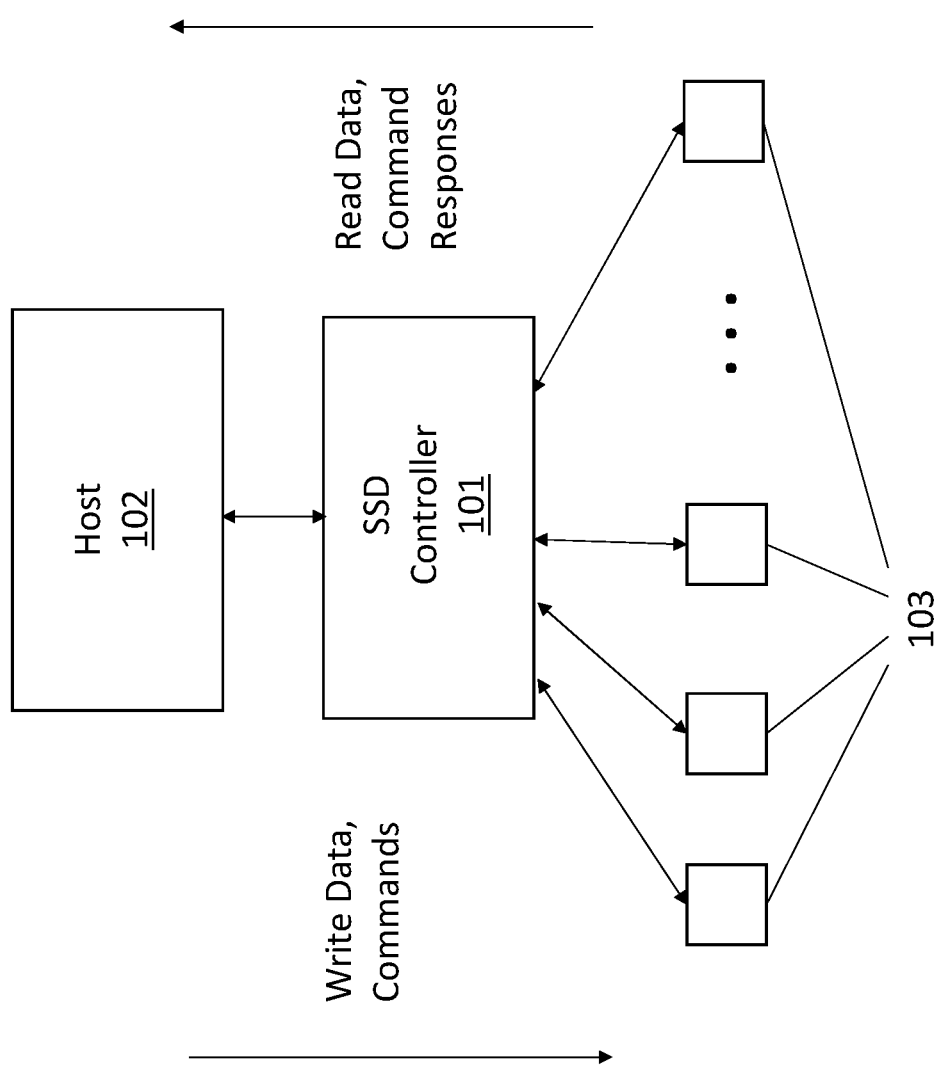
FIG. 1 shows a solid state drive (SSD)

FIG. 1 shows a common Solid State Drive (SSD) controller channel environment such as an NVM Express (NVMe) Open-Channel SSD controller implementation. As observed in FIG. 1, an SSD controller 101 is responsible for managing: 1) the flow of commands and write data from a host 102 to any of multiple storage devices 103; and, 2) the flow of read data and any command responses sent from any of the storage devices 103 to the host 102. In various implementations, the storage devices 103 are NANO flash memory chips and the SSD controller 101 is a controller semiconductor chip that is packaged in an SSD device with the NANO flash memory chips 103.

In at least NVMe implementations, each storage device 103 is considered to be divided into a plurality of logical units (referred to as logical unit numbers (LUNs)), where, each individual LUN within a particular SSD device is capable of behaving like an independent non volatile mass storage device. That is, each LUN is capable of erasing data in response to an erase command, providing read data in response to a read command, receiving and storing write data in response to a write or "program" command and otherwise responding to host commands.

In higher performance systems (e.g., data center servers, rack mounted computing implementations, etc.) the host 102 may include multiple central processing unit (CPU) cores each supporting multiple software threads any one of which can make use of the storage resources of the storage devices 103. The host 102 may also include other hardware and/or software units that can use or otherwise communicate with the storage devices such as main memory controllers, high performance off-load processors (e.g. graphics processing units (GPUs), digital signal processors (DSPs) and/or their associated program code), accelerators (e.g., neural network accelerators for artificial intelligence and/or machine learning applications), etc. Any one of these components can be viewed as different users or clients of the storage devices 103.

At least in the case of higher performance systems (which frequently include large numbers of users/clients that place significant demands on non volatile mass storage), the flow of commands to the storage devices 103 from the host 102 and the transfer of read and write data between the host 102 and the storage devices 103 requires high bandwidth communication channels between the SSD controller 101 and the storage devices 103. Unfortunately, in current systems, the communications protocol between the SSD controller 101 and the storage devices 103 can introduce fairness issues between users/clients of the storage devices 103. That is, one user's traffic can receive a disproportionate share of a channel's bandwidth which, in turn, is observed by the other users/clients as slow non volatile mass storage.

Figure 2:
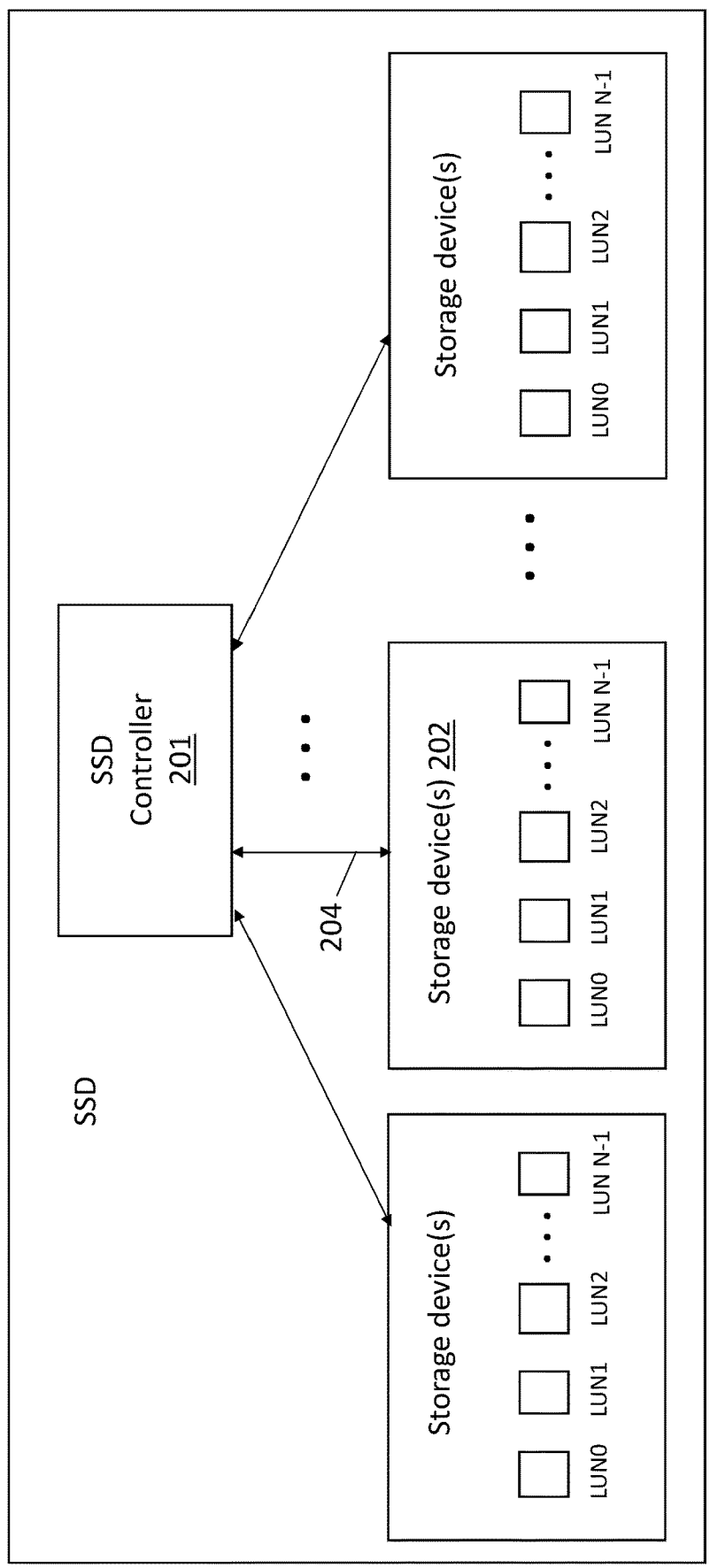
FIG. 2 shows one or more storage devices of an SSD organized into a group of LUNs.

FIG. 2 elaborates on one particular fairness issue. As observed in FIG. 2, the SSD controller 201 is physically connected to multiple LUNs through a same, shared physical channel 204. With a single channel 204 supporting communications between the SSD controller 201 and the multiple LUNs, the SSD controller 201 attempts to fairly give each of the multiple LUNs the same amount of access to the channel 204 for their respective read/write operations. That is, ideally, each of the LUNs receive the same amount of access to the channel 204 over an extended runtime of the system.

Unfortunately, program data transfers from the SSO controller to the targeted LUN can be much larger in terms of transferred data amount than read data transfers or other kinds of traffic (e.g., erase commands, status commands and associated responses, etc.) between the LUNs and the SSO controller 201. The disproportionate size of program data transfers verses read data transfers or other kinds of operations in many cases is an artifact of the underlying storage medium technology such as NANO flash cells.

Here, as is known in the art, NANO storage devices are capable of being programmed in units of multiple planes (e.g., one program operation writes to 8 planes with 16 KB/plane=128 kB). By contrast, read operations are performed in much smaller data units (e.g., 4 kB). Thus, in a system with NANO storage devices that can individually provide 4 kB units of read data but can accept program operations as large as 128 kB, program data transfers from the SSO controller to the targeted LUN can take 32 times longer to complete than read operations.

With the SSO controller 201 designed to allocate the resources of the channel 204 across multiple LUNs, a program data transfer directed from the SSO controller to a particular LUN can exclude other LUNs from use of the channel 204 for extended periods of time. This can be particularly "unfair" if the excluded LUNs have large numbers of important, less data intensive operations (e.g., read data transfers and any of a number of host commands). Here, if the operations associated with the excluded LUNs are mainly read data transfers and/or host commands, from an operation completion perspective, many (if not all) of the excluded LUNs could complete most (if not all) of their pending operations in the time consumed waiting for completion of a single program operation's data transfer to a particular LUN.

One way to increase the speed of non volatile mass storage from the perspective of the users/clients of the excluded LUNs is to increase the bandwidth of the channel 204. Increasing the bandwidth of the channel 204 (either by increasing the channel's word size or line speed, or both), however, will result in a corresponding increase in channel power consumption. Increasing power consumption per channel is less desirable particularly in the case of a high performance environment (e.g., data center environments) where large numbers of SSDs each having multiple channels are likely to reside in a single computer system and/or data center.

Another way to mitigate the issue is to reduce the number of LUNs per channel. E.g., if there was one channel dedicated to each LUN, the impact of the problem would be dramatically reduced. However, again, power consumption would expand beyond desirable levels. Additionally, greater channel fanout does not solve the problem of read that wants to target a same LUN that is currently receiving program data from the SSD controller.

Figure 3:
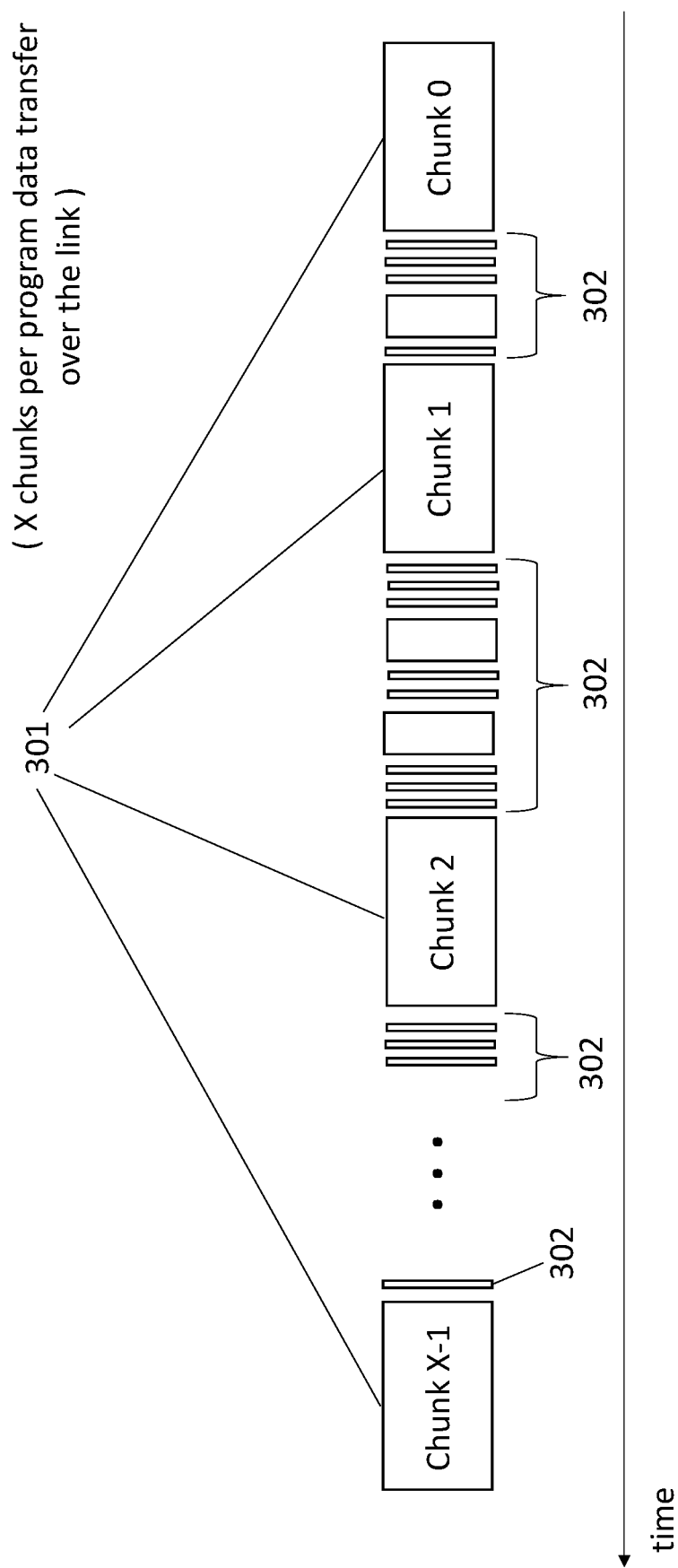
FIG. 3 shows a method of transferring write data for a program operation to a LUN.

FIG. 3 shows a solution that overcomes the above described channel allocation fairness problem. As observed in FIG. 3, the write data of a single program operation is broken down into smaller units ("chunks") 301 and transferred from the SSD controller to the targeted LUN as discrete chunks on a chunk-by-chunk basis. In various embodiments, the size of each chunk corresponds to some number of data units less than the granularity of the targeted LUN's program operation. For instance, as just one example, for a LUN having a program granularity of 128 kB units of write data per program operation, each chunk corresponds to any of one, two, three or four kB of write data or more.

The smaller chunks are individually sent from the SSD controller to the targeted LUN over the channel with time in between consecutive chunk transfers being reserved on the channel for the transactions of other LUNs 302. As such, many LUNs that would otherwise be excluded from accessing the channel during the write operation are able to service some/all of their respective requests during the transfer of the program data resulting in more fair allocation of the channel over time.

The amount of time and/or transactions for other LUNs that are reserved in between consecutive program data chunk transfers to a particular, different LUN can vary from embodiment to embodiment. According to just one of many possible implementations/configurations, program data chunk size is reduced to 4 kB and every LUN that is coupled to the channel is allocated up to a 4 kB transfer in between each chunk transfer of a data transfer for a particular program operation. In this particular approach, true fairness is actually achieved in the situation where other LUNs have read and/or write data.

That is, for example, if over the course of a data transfer for a program operation directed to a particular LUN on a channel every other LUN that is coupled to the same channel has a 4 kB unit of read data to transfer to the host in between the chunk transfers over the channel, a fair "round-robin" bandwidth allocation scheme will be effected across the channel (all LUNs that are coupled to the channel will receive 4 kB worth of bandwidth over the course of the program data transfer).

In other or combined embodiments, the SSD controller recognizes certain high priority commands and/or other traffic items and looks to insert such traffic items in between chunk transfers for a particular program operation. For example, according to one approach, the SSD controller maintains outbound (from host to LUN) and inbound (from LUN to host) traffic queues for the LUNs that the SSD controller communicates with over a particular channel. Over the course of the chunk-by-chunk data transfer for a particular program operation, the SSD controller snoops its internal outbound and inbound queues and inserts between consecutive chunks on the channel those of the traffic items discovered in the queues that are deemed higher priority than chunk transfers.

In various embodiments, high priority outbound traffic items include some or all of: 1) read commands (the SSD controller requests the LUN to fetch data at an address specified in the request); 2) read status commands (the host asks the LUN for the status of an earlier requested read operation); 3) suspend requests (the SSD controller requests the LUN to suspend an in-progress program or erase operation); 4) suspend status polls (the SSD controller asks the LUN whether an earlier requested program or erase operation has successfully been suspended).

In combined or other embodiments, high priority inbound traffic items include some or all of: 1) read data transfer requests (the LUN requests the SSD controller to receive read data that was earlier requested by the host); 2) read data (the actual read data transfer over the channel); 3) responses to suspend status polls; and, 4) responses to read status polls.

In various embodiments, the SSD controller determines, e.g., during (and/or before) the transfer of a chunk of write data to a particular LUN for a program operation, if there are other pending traffic items for other LUNs that are deemed higher priority than the write data transfer. Again, in various embodiments, any/all of the traffic items listed just above can be deemed to be higher priority than a transfer of a chunk of program data.

With all higher priority pending traffic items being determined by the time a chunk transfer 301 completes, the SSD controller then proceeds to sequentially insert these traffic items 302 on the channel immediately after the chunk transfer completes. The higher priority traffic items 302 are dispatched irrespective of which other LUNs are involved (the traffic items can all be directed to one LUN, can be spread across all other LUNs, etc.). That is, whichever other LUNs happen to have pending higher priority traffic items by the time a chunk transfer completes, such LUNs have their respective traffic items immediately issued on the channel after completion of the chunk transfer.

Note that although LUNs other than the LUN whose program data is in flight can have their higher priority traffic inserted onto the channel, conceivably, even the same LUN that is receiving the program data can suspend the reception of program data so that it can engage in a higher priority transaction in between chunk transfers. For simplicity the remainder of the discussion will refer mainly to excluded LUNs as being the sole beneficiaries of higher priority traffic inserted between chunks but the reader should keep in mind that the LUN that is the target of the program data transfer can also similarly benefit.

After the higher priority traffic items have been issued on the channel, essentially no other higher priority traffic items are formally pending. As such, the SSD controller then issues a next chunk of write data for the program operation (the next chunk transfer for the program operation is resumed on the channel). The process then continues with higher priority traffic items 302 being inserted between transfers of chunks 301 until all chunk transfers for the particular program operation have been completed (in the particular depiction of FIG. 3, there are X chunk transfers for the program operation).

During the transfer of any chunk, in various embodiments, the SSD controller is setting up transmission of the group of higher priority traffic items immediately after the chunk transfer has completed. According to one approach, the SSD controller continues to monitor for pending higher priority traffic items until the completion of the chunk's transfer and issues them immediately after the chunk transfer completes. In other embodiments, the "cut-off" for recognizing higher priority traffic items for issuance immediately after completion of a chunk transfer can be earlier in time (e.g., three quarters of the way through the chunk transfer, half way through the chunk transfer, the start of the chunk transfer, etc.).

In runtime environments where there are large amounts of interceding higher priority traffic items 302, conceivably, the write data transfer for the program operation, as a whole, can be deemed "starved" or otherwise not completed in a desired amount of time.

As such, according to one embodiment, the SSD controller starts a timer commensurate with the sending of the initial chunk of write data for a particular program operation. If there are still more chunks of data to be transferred for the program operation when the timer expires (presumably because large amounts of higher priority traffic 302 have been transferred in between whichever chunks were able to be sent) the SSD controller re-arranges its priority scheme such that the transfer of the program operation's remaining, pending write data is the SSD controller's higher priority traffic (above all other forms of traffic that were just previously deemed to be higher priority than the transfer of the write data). Thereafter, the channel is devoted to sending chunks in sequence (or simply the remainder of the write data as one continuous block) until all of the program operation's write data has been transferred over the channel.

In other embodiments, some other mechanism besides a timer is used by the SSO controller to determine that the transferring of chunked write data for a particular program operation is deemed to be in danger of starving. For example, the SSO controller can count how many interceding higher priority traffic items have been issued between consecutive chunks, and, when the count reaches some preset limit the SSO controller switches over to deeming the transferring of the program operation's write data as the SSO controller's highest priority traffic. Alternatively or in combination, the SSO controller can determine how much time has been spent transferring interceding higher priority traffic items between consecutive chunks, and when the total amount of time reaches some preset limit the SSO controller switches over to deeming the transferring of the chunks of write data as the SSO controller's highest priority traffic.

As is known in the art, NANO flash storage devices typically includes multiple "planes" where each plane includes multiple blocks of storage cells. Current NANO flash chips write to multiple planes during a single program operation.

Figure 4:
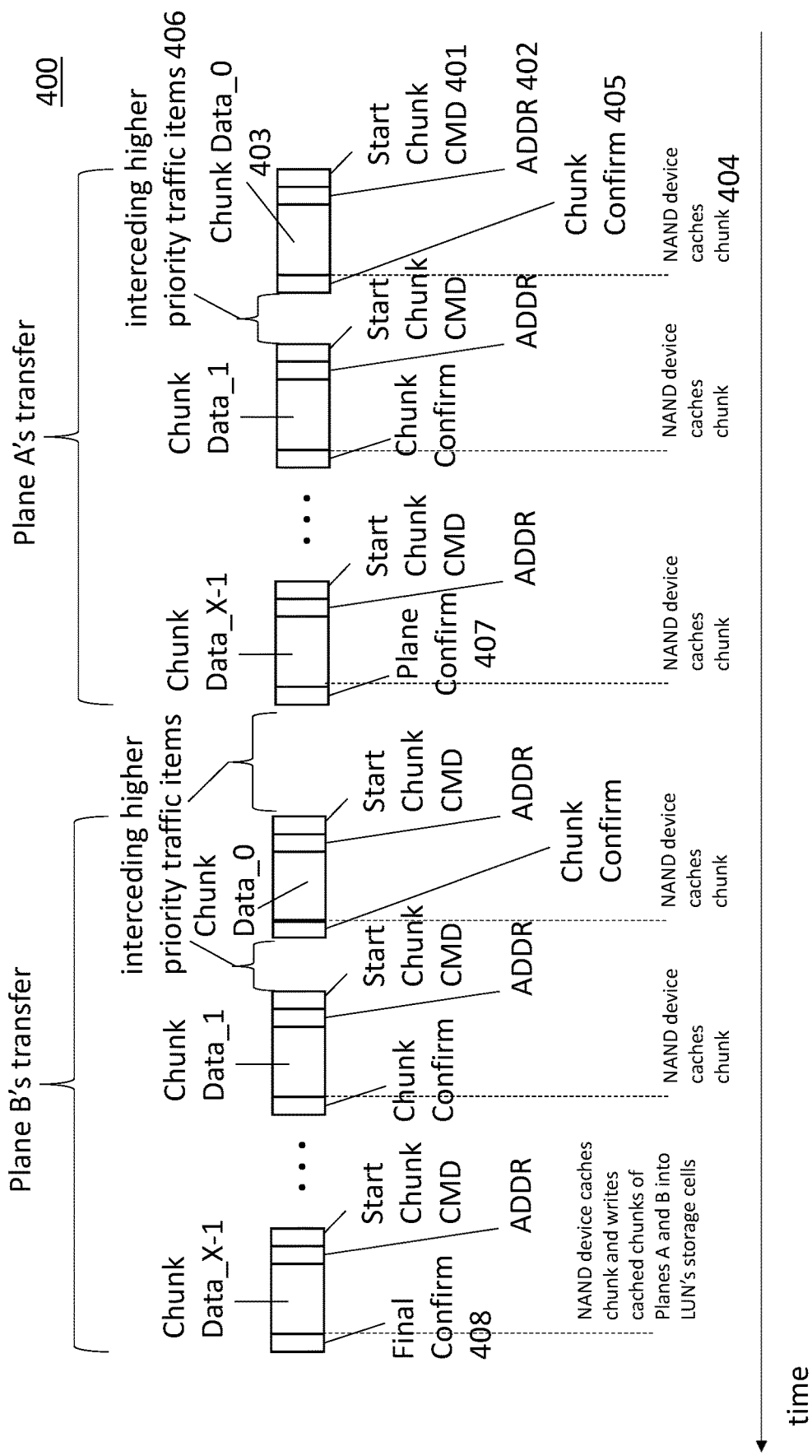
FIG. 4 shows a method of transferring write data for multi-plane program operation.

FIG. 4 depicts an exemplary multi-plane program operation in which two planes A and B are fully written to in a single program operation 400. As observed in FIG. 4, the operation begins with the SSO controller issuing a Start Chunk command 401 for the initial chunk (chunk data_O) which is understood to be the start of the overall transfer of write data for plane A's program operation. The SSO controller next sends the address 402 to be written to followed by the first chunk of data 403. In various embodiments, the address 402 identifies the plane and block addresses to be written to within the targeted LUN. The storage device that includes the targeted LUN then caches the received chunk 404 in its internal cache space, which can be reserved for plane A. The SSD controller then sends a Chunk Confirm message 405 to the NANO device.

Any higher priority traffic items 406, even for other LUNs, are then free to be issued on the channel. When no higher priority items are available for issuance on the channel, the SSD controller issues a next Chunk Start command for the second chunk (chunk data_I) of plane A's write data. The SSD controller then sends the address and the second chunk of data. The storage device with the targeted LUN caches the second chunk and the SSD controller sends a Chunk Confirm message which signifies that the second chunk has been successfully received. The sequence then continues until the last chunk for plane A is transferred (chunk data_x−1), the storage device having the targeted LUN caches the data and sends a Plane Confirm message 407 which signifies to the SSD controller that the set of write data for plane A has been successfully received.

The process that was performed by the SSD controller and the storage device having the targeted LUN for plane A is then repeated for plane B. After all of the data for plane B has been successfully received at the storage device, the SSD controller sends a Final Confirm message 408 which signifies that the storage device has fully received both planes of data and deems the transfer operation fully completed. The storage device then reads the data for planes A and B from its cache and writes the data into the appropriate storage cells of the targeted LUN.

In various embodiments the enhanced, chunked transfer process is automatically suspended in favor of prioritizing the transfer of all of the write data for a particular in-flight program operation if a Power Loss Imminent message is received by the SSD controller. Here, in the case of a PLI message, power will soon be removed from the SSD. As such, the SSD needs to close all open transactions and not open any new ones so that the state of the SSD is stable (no in-flight processes) by the time its underlying circuitry can no longer operate. In this case, when the PLI is received, the program write data transfer is still in process and any higher priority transactions that would otherwise follow the chunk being transferred have not been issued yet. The SSD controller therefore makes the decision not to start the higher priority transactions and close-out the in-flight write data operation instead.

Although embodiments described above have considered all LUNs to be of equal priority, in various embodiments, some LUNs may be given higher priority over other LUNs. In such embodiments, all traffic items associated with a higher priority LUN are interceded between data chunks of a lower priority LUN. Note that the higher priority LUN's traffic can include a program operation write data transfer. In this case, depending on the circumstances, the SSD controller can suspend the lower priority write data transfer or continue to send chunks for the lower priority write data transfer. In the case of the later, the higher priority data transfer in various embodiments is chunked so that chunks from both the higher and lower priority transfers are multiplexed on the channel. If a non chunked approach were to be taken for the higher priority transfer, it could trigger the starvation mechanism for the lower priority transfer.

Figure 5:
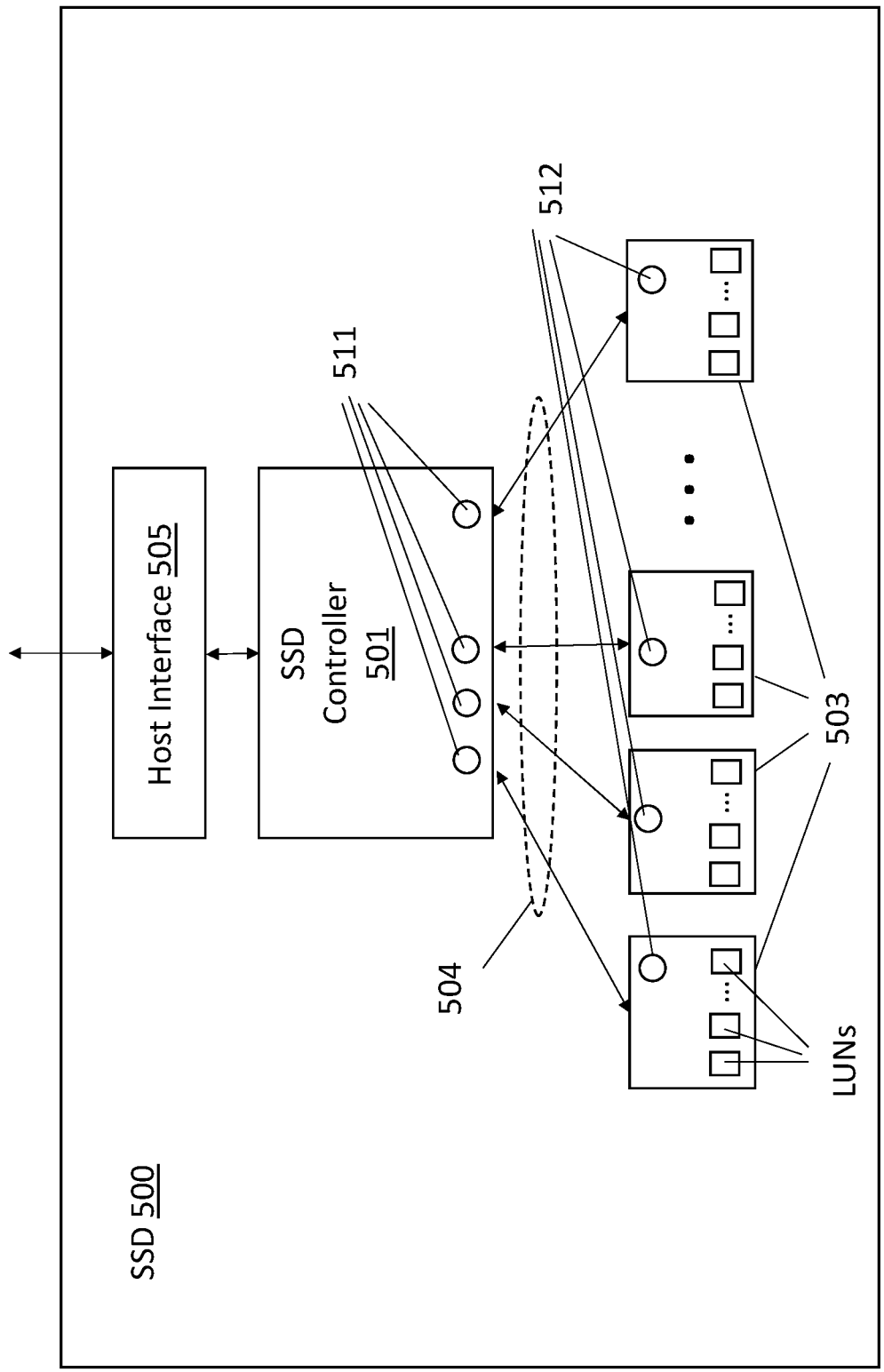
FIG. 5 show an improved solid state drive.

FIG. 5 shows an SSD 500 having an SSD controller 501 and multiple storage devices 503 (e.g., flash memory chips 503). The SSD 500 also includes multiple communication channels 504. Each communication channel connects the SSD controller 501 to one or more storage devices (for ease of drawing FIG. 5 only shows one channels per storage device but the reader should understand that there can be implementations with multiple storage devices per channel). As depicted in FIG. 5, both the SSD controller 501 and the storage devices 503 include respective instances of channel communication protocol logic 511, 512 at each channel interface to carry out any/all of the above described channel communication processes carried out between the SSD controller and a storage device.

Depending on implementation, the SSD controller 501, the SSD controller's respective instances of communication protocol logic 511 and/or the storage devices' respective instances of communication protocol logic 512 are implemented as custom hard wired logic circuitry (e.g., application specific integrated circuit (ASIC) logic circuitry), programmable logic circuitry (e.g., field programmable gate array (FPGA) logic circuitry), logic circuitry that executes some form of program code (e.g., a processor or microcontroller, embedded or otherwise, that, e.g., executes firmware) or any combination of these.

The SSD 500 also includes a host interface 505 that is designed to support one or more host communication interface protocols for storage peripherals such as, Peripheral Components Interconnect Express (PCIe), NVMe, Serial ATA (SATA), etc.

In various embodiments the storage devices 503 may be composed of storage cells other than NANO flash storage cells. For example, any of various emerging nonvolatile memory technologies can be used. Although many such technology can perform writes/programs at same granularities as reads, other benefits (e.g., LUNs of different priority) may arise with the teachings above with an emerging non volatile memory technology.

In various embodiments the SSD controller, or the SSD generally, includes register space so that various parameters can be specially configured for the SSD's operation. Such parameters can include any/all of chunk size; which traffic items are deemed higher priority than a chunk of program write data, etc.

Emerging non volatile memory technologies are often composed of three dimensional arrays of storage cells that are formed above a semiconductor chip's substrate amongst/within the chip's interconnect wiring. Such cells are commonly resistive and store a particular logic value by imposing a particular resistance through the cell (e.g., a first resistance corresponds to a first stored logical value and a second resistance corresponds to a second logical value). Examples of such memory include, among possible others, Optane™ memory from Intel Corporation, phase change memory, resistive random access memory, dielectric random access memory, ferroelectric random access memory (FeRAM) and spin transfer torque random access memory (STT-RAM).

Figure 6:
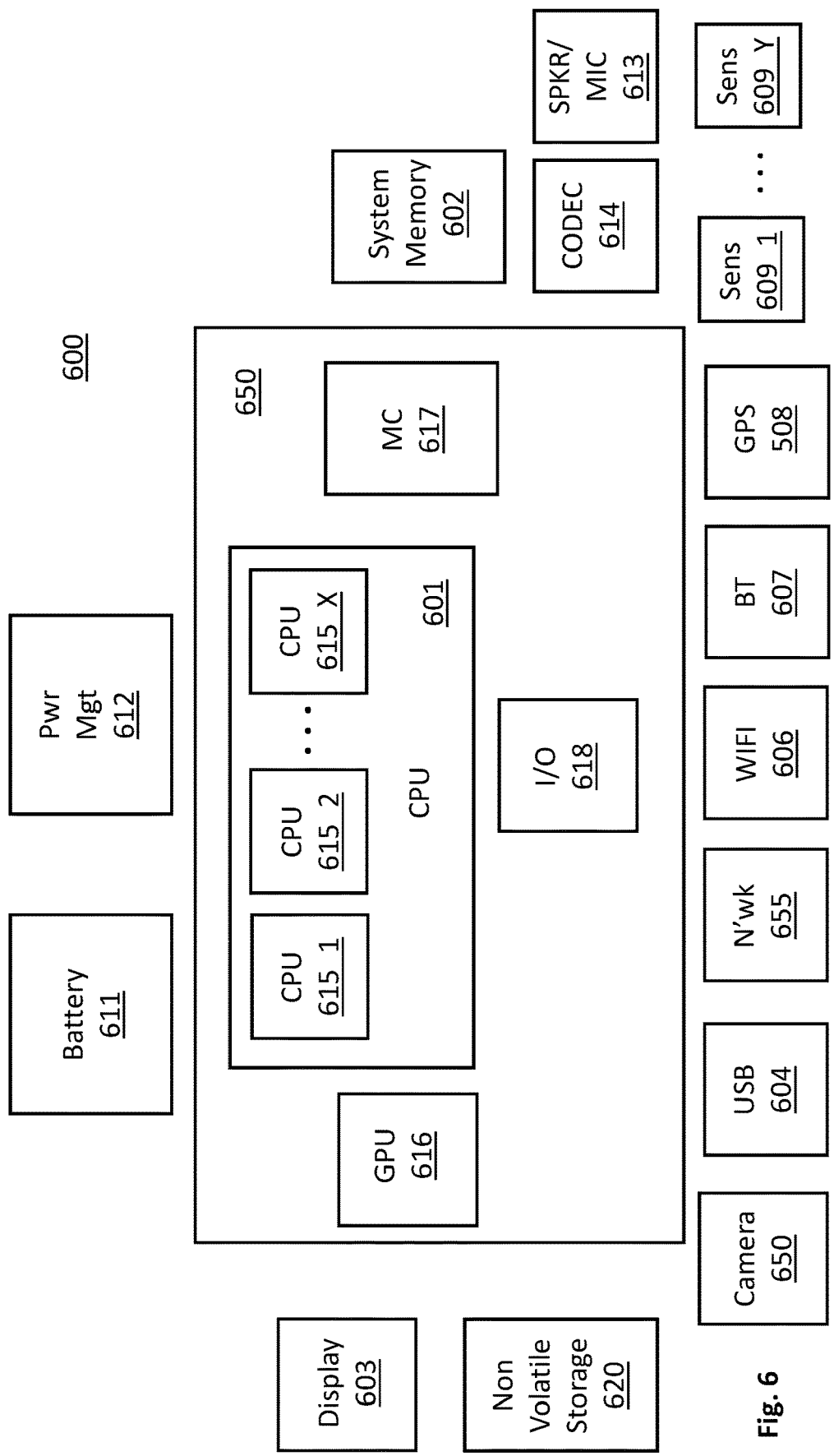
FIG. 6 shows a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the system and application software of the computing system. The graphics processing unit 616 typically executes graphics intensive functions to, e.g., generate graphics information that is presented on the display 603. The memory control function 617 interfaces with the system memory 602 to write/read data to/from system memory 602.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The power management control unit 612 generally controls the power consumption of the system 600.

Apart from interfacing with any of the above I/O components, the I/O control function 618 can also interface with the computing system's non volatile mass storage 620. The computing system's non volatile mass storage 620 can be implemented with SSD devices having internal channels that chunk program write data transfers between the SSD's internal controller and the SSD's storage devices as described at length above.

Additionally, conceivably, the I/O control function 618 can be integrated with communication protocol interface logic circuitry and corresponding functionality so as to implement chunking of program write data between the I/O control function and individual SSDs that are coupled to the I/O control function which have corresponding communication protocol interface logic circuitry integrated into their respective host interfaces. In this case, the teachings provided above with respect to chunking of program write data can be extended from being internal to an SSD to being external between SSD devices and the I/O control function.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a memory; and
    one or more hardware processors coupled to the memory and coupled to a channel coupled to a solid state storage device, the one or more hardware processors being configured at least to:
    transfer one or more traffic items between portions of a single program operation's write data on the channel coupled to the solid state storage device, wherein the one or more traffic items are not part of the single program operation; and
    after the transferring of the one or more traffic items, and in response to determining that the single program operation's write data was not programmed within a predetermined amount of time:
        transfer all remaining portions of the single program operation's write data without transferring other one or more traffic items.

2. The apparatus of claim 1, wherein the one or more traffic items are of a higher priority than the write data of the single program operation.

3. The apparatus of claim 1, wherein the solid state storage device is a NAND flash storage device.

4. The apparatus of claim 1, wherein the one or more traffic items comprise:
    a read command;
    a read status command;
    a suspend request;
    a suspend status poll;
    a read data transfer request;
    read data;
    a response to a suspend status poll;
    a response to a read status poll; or
    any combination thereof.

5. The apparatus of claim 1, wherein the one or more hardware processors are further configured to:
    send a start command to the solid state storage device on the channel before transferring a first portion of the portions of the single program operation's write data to the solid state storage device; and
    send a confirm message to the solid state storage device after transferring all of the single program operation's write data to the solid state storage device.

6. The apparatus of claim 1, wherein the solid state storage device is configured to program more than one plane of the solid state storage device with the single program operation's write data.

7. The apparatus of claim 1, wherein the one or more hardware processors are further configured to transfer all remaining portions of another single program operation's write data without transferring other one or more traffic items in response to determining that a power loss event is imminent after transferring at least two portions of the other single program operation's write data.

8. The apparatus of claim 1, wherein the one or more hardware processors are further configured to:
    determine a size of each of the portions of the single program operation's write data before transferring the one or more traffic items between the portions of the single program operation's write data on the channel coupled to the solid state storage device.

9. A method for transferring data, comprising:
    transferring, using one or more hardware processors coupled to a channel coupled to a solid state storage device, one or more traffic items between portions of a single program operation's write data on the channel coupled to the solid state storage device, wherein the one or more traffic items are not part of the single program operation; and
    after the transferring of the one or more traffic items, and in response to determining that the single program operation's write data was not programmed within a predetermined amount of time:
        transferring all remaining portions of the single program operation's write data without transferring other one or more traffic items.

10. The method of claim 9, wherein the one or more traffic items are of a higher priority than the write data of the single program operation.

11. The method of claim 9, wherein the solid state storage device is a NAND flash storage device.

12. The method of claim 9, wherein the one or more traffic items comprise:
    a read command;
    a read status command;
    a suspend request;
    a suspend status poll;
    a read data transfer request;
    read data;
    a response to a suspend status poll;
    a response to a read status poll; or
    any combination thereof.

13. The method of claim 9, further comprising:
    sending a start command to the solid state storage device on the channel before transferring a first portion of the portions of the single program operation's write data to the solid state storage device; and
    sending a confirm message to the solid state storage device after transferring all of the single program operation's write data to the solid state storage device.

14. The method of claim 9, further comprising:
    programming more than one plane of the solid state storage device with the single program operation's write data.

15. The method of claim 9, further comprising:
    transferring all remaining portions of another single program operation's write data without transferring other one or more traffic items in response to determining that a power loss event is imminent after transferring at least two portions of the other single program operation's write data.

16. The method of claim 9, further comprising:
determining a size of each of the portions of the single program operation's write data before transferring the one or more traffic items between the portions of the single program operation's write data on the channel coupled to the solid state storage device.

17. A non-transitory computer-readable medium containing computer executable instructions that, when executed by one or more processors coupled to a channel coupled to a solid state storage device, cause the one or more processors to perform a method for transferring data, the method comprising:
transferring one or more traffic items between portions of a single program operation's write data on the channel coupled to the solid state storage device, wherein the one or more traffic items are not part of the single program operation; and
after the transferring of the one or more traffic items, and in response to determining that the single program operation's write data was not programmed within a predetermined amount of time:
transferring all remaining portions of the single program operation's write data without transferring other one or more traffic items.

18. The non-transitory computer-readable medium of claim 17, wherein the one or more traffic items are of a higher priority than the write data of the single program operation.

19. The non-transitory computer-readable medium of claim 17, wherein the solid state storage device is a NAND flash storage device.

20. The non-transitory computer-readable medium of claim 17, wherein the one or more traffic items comprise:
a read command;
a read status command;
a suspend request;
a suspend status poll;
a read data transfer request;
read data;
a response to a suspend status poll;
a response to a read status poll; or
any combination thereof.

21. The non-transitory computer-readable medium of claim 17, wherein the method further comprises:
sending a start command to the solid state storage device on the channel before transferring a first portion of the portions of the single program operation's write data to the solid state storage device; and
sending a confirm message to the solid state storage device after transferring all of the single program operation's write data to the solid state storage device.

22. The non-transitory computer-readable medium of claim 17, wherein the method further comprises:
programming more than one plane of the solid state storage device with the single program operation's write data.

23. The non-transitory computer-readable medium of claim 17, wherein the method further comprises:
transferring all remaining portions of another single program operation's write data without transferring other one or more traffic items in response to determining that a power loss event is imminent after transferring at least two portions of the other single program operation's write data.

24. The non-transitory computer-readable medium of claim 17, wherein the method further comprises:
determining a size of each of the portions of the single program operation's write data before transferring the one or more traffic items between the portions of the single program operation's write data on the channel coupled to the solid state storage device.

\* \* \* \* \*